United States Patent
Liao

(10) Patent No.: US 11,962,714 B2
(45) Date of Patent: Apr. 16, 2024

(54) MULTIPATH DEVICE WORKING SYSTEM

(71) Applicant: YEALINK (XIAMEN) NETWORK TECHNOLOGY CO., LTD., Fujian (CN)

(72) Inventor: Yun Liao, Fujian (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 43 days.

(21) Appl. No.: 17/842,763

(22) Filed: Jun. 16, 2022

(65) Prior Publication Data

US 2022/0407954 A1 Dec. 22, 2022

(30) Foreign Application Priority Data

Jun. 17, 2021 (CN) .......................... 202110674696.6

(51) Int. Cl.
*H04M 1/72448* (2021.01)

(52) U.S. Cl.
CPC .............................. *H04M 1/72448* (2021.01)

(58) Field of Classification Search
CPC ......... H04M 1/72448; H04M 1/72412; H04M 2250/02; H04M 2250/22; H04M 1/72409; H04M 1/7243; H04M 1/72469; H04M 3/568; H04W 88/06; Y02P 90/02
See application file for complete search history.

(56) References Cited

U.S. PATENT DOCUMENTS

| | | | | |
|---|---|---|---|---|
| 2007/0245057 A1* | 10/2007 | Bohm | ................... | G06F 13/385 710/313 |
| 2014/0181338 A1* | 6/2014 | Loh | ......................... | G06F 21/00 710/63 |
| 2018/0046429 A1* | 2/2018 | Jensen | .................. | G06F 13/426 |

FOREIGN PATENT DOCUMENTS

| CN | 204216969 U | * | 3/2015 |
|---|---|---|---|
| CN | 204216969 U | | 3/2015 |

* cited by examiner

*Primary Examiner* — Angelica Perez

(57) ABSTRACT

The present disclosure provides a multipath device working system, including a processor and a touch display module, a control management module, a wireless communication module, a USB module, a microphone, and a loudspeaker that are respectively connected to the processor. The touch display module is configured to display a user operation interface and obtain a control instruction from a user. Both the wireless communication module and the USB module are configured to perform data transmission between the multipath device working system and an external communication device. The control management module is configured to manage a plurality of software communication terminals on the external communication device. The processor is configured to separately perform data processing on data transmitted by the touch display module, the control management module, the wireless communication module, the USB module, the microphone, and the loudspeaker.

5 Claims, 2 Drawing Sheets

MULTIPATH DEVICE WORKING SYSTEM

CROSS-REFERENCE TO RELATED APPLICATIONS

The present application claims the benefit of Chinese Patent Application No. 202110674696.6 filed on Jun. 17, 2021, the contents of which are hereby incorporated by reference.

TECHNICAL FIELD

The present disclosure relates to the field of communication technologies, and in particular, to a multipath device working system.

BACKGROUND

At present, an increasingly high requirement is imposed for desktop office, and an increasing number of device such as business headsets, microphones, chargers, personal computers, and phones are required. The related art has the following disadvantages: 1. Business headsets, external speakers, chargers, personal computers, phones, and the like are designed separately without comprehensively considering connection and cooperation among various parts, resulting in messy and cumbersome work such as installation and use, maintenance, and wiring. 2. Various communication devices such as mobile phones, computer communication software, and desktop session initiation protocol (SIP) phones need to be controlled separately, making it inconvenient for users to operate. For example, when Unified Communications (UC) software of a computer has a call, the call is answered by a headset, and a control operation needs to be performed on phone software of the computer. In this case, if a mobile phone or a SIP phone has a call, the call needs to be hung up or an operation is performed on the mobile phone when the call of the UC software of the computer is kept, resulting in a troublesome operation. 3. A plurality of software communication terminals are incompatible and conflict with each other. Different software terminals cannot be used at the same time. For example, there are the Teams and Zoom terminals on a personal computer of a user. In this case, if the user communicates with the outside by the Teams, a third party cannot communicate with the user by the Zoom or the Teams is hung up during communication.

Based on the foregoing, the existing technical solution has the disadvantages of messy wiring, troublesome deployment, complex operation, and poor compatibility.

SUMMARY

The present disclosure is intended to provide a multipath device working system, to resolve the technical problems, so that a plurality of communication devices and software communication terminals can be uniformly controlled, to facilitate the convenience of usage and simplify work deployment and device wiring.

To resolve the technical problem, the present disclosure provides a multipath device working system, including a processor and a touch display module, a control management module, a wireless communication module, a universal serial bus (USB) module, a microphone, and a loudspeaker that are respectively connected to the processor, wherein the touch display module is configured to display a user operation interface and obtain a control instruction from a user;

both the wireless communication module and the USB module are configured to perform data transmission between the multipath device working system and an external communication device;

the control management module is configured to manage a plurality of software communication terminals on the external communication device; and the processor is configured to separately perform data processing on data transmitted by the touch display module, the control management module, the wireless communication module, the USB module, the microphone, and the loudspeaker.

As a preferred solution, the multipath device working system further includes an audio mixing module configured to mix a plurality of channels of voice data transmitted by the external communication device, the wireless communication module, and the USB module.

As a preferred solution, the wireless communication module includes a digital enhanced cordless telecommunications (DECT) module and a Bluetooth module.

As a preferred solution, the audio mixing module includes a first audio mixer located on the DECT module and a second audio mixer located on the processor.

As a preferred solution, the Bluetooth module includes at least one of a built-in Bluetooth and an external Bluetooth Dongle.

As a preferred solution, the USB module includes a plurality of USB interfaces.

As a preferred solution, the control management module is located on the external communication device connected to the multipath device working system.

As a preferred solution, the control management module is a program located in the multipath device working system, and the program is downloaded to the external communication device connected to the multipath device working system and runs on an operating system of the external communication device.

As a preferred solution, the external communication device includes at least one of a wireless headset, a personal computer, a mobile phone, and a desktop session initiation protocol (SIP) phone.

Compared with the related art, the present disclosure has the following beneficial effects.

The present disclosure provides a multipath device working system, including a processor and a touch display module, a control management module, a wireless communication module, a USB module, a microphone, and a loudspeaker that are respectively connected to the processor. The touch display module is configured to display a user operation interface and obtain a control instruction from a user. Both the wireless communication module and the USB module are configured to perform data transmission between the multipath device working system and an external communication device. The control management module is configured to manage a plurality of software communication terminals on the external communication device. The processor is configured to separately perform data processing on data transmitted by the touch display module, the control management module, the wireless communication module, the USB module, the microphone, and the loudspeaker. In the present disclosure, a plurality of communication devices and software communication terminals can be uniformly controlled, to facilitate the convenience of usage and simplify work deployment and device wiring.

DETAILED DESCRIPTION

The technical solutions in embodiments of the present disclosure are described below clearly and completely with reference to the drawings in the embodiments of the present disclosure. Apparently, the described embodiments are merely part rather than all of the embodiments of the present disclosure. All other embodiments obtained by a person of ordinary skill in the art based on the embodiments of the present disclosure without creative efforts should fall within the protection scope of the present disclosure.

Figure 1:
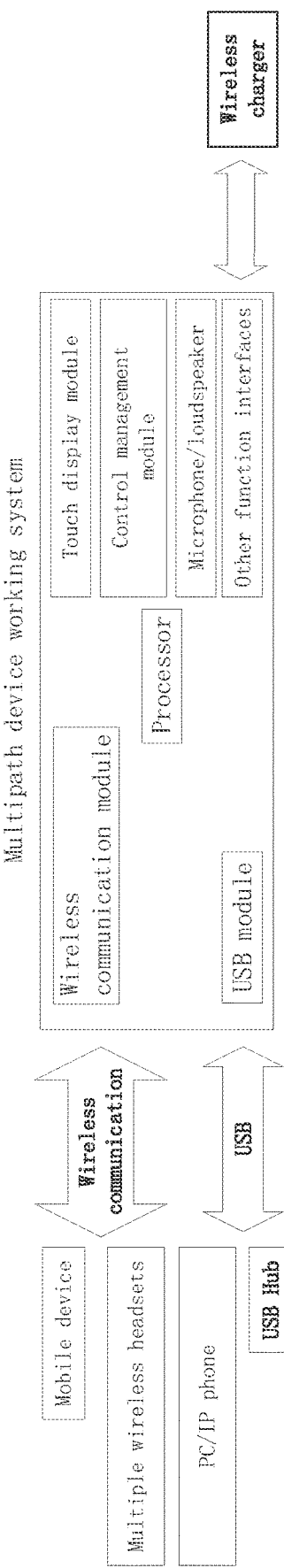
FIG. 1 is a schematic structural diagram of a multipath device working system according to an embodiment of the present disclosure.

Referring to FIG. 1, an embodiment of the present disclosure provides a multipath device working system, including a processor and a touch display module, a control management module, a wireless communication module, a USB module, a microphone, and a loudspeaker that are respectively connected to the processor. In this embodiment of the present disclosure, as a preferred solution, the wireless communication module includes a DECT module and a Bluetooth module. The USB module includes a plurality of USB interfaces. As a preferred solution, the processor adopts an YL2018G chip, the DECT module adopts a DCX81 68PIN chip, and the Bluetooth module adopts a BTM805 CSR8811 chip. It should be noted that in an actual application, to avoid insufficient computing power of the processor, the processor, the DECT module, and the Bluetooth module may be processed by different chips.

The touch display module is configured to display a user operation interface and obtain a control instruction from a user.

Both the wireless communication module and the USB module are configured to perform data transmission between the multipath device working system and an external communication device. In this embodiment of the present disclosure, the external communication device includes at least one of a wireless headset, a personal computer, a mobile phone, and a desktop session initiation protocol (SIP) phone.

The control management module is configured to manage a plurality of communication software on the external communication device. Specifically, the control management module may implement a protocol conversion function, to resolve a compatibility problem of the plurality of communication software caused by different protocols. In this embodiment of the present disclosure, the control management module may be a program stored in the multipath device working system. The program is downloaded to the external communication device connected to the multipath device working system and runs on an operating system of the external communication device. The multipath device working system further includes a storage module configured to store software running on the external communication device. For example, the storage module may be a virtual CD disk or a Flash. As a preferred solution, no record is left on the external communication device after the program runs and is used on the operating system of the external communication device. Specifically, the program is an installation-free application and is a program that runs on a personal computer or another processing device coupled to an electronic device without making a permanent configuration change to the external communication device such as a personal computer. All of these programs have no record, which means that all temporary files, registry entries, and any other changes to a machine exist only when the programs are running. In this embodiment of the present disclosure, the control management module may be stored in the external communication device connected to the multipath device working system. For example, a user directly downloads the control management module from a software application store and installs the control management module on the external communication device such as a personal computer.

The processor is configured to separately perform data processing on data transmitted by the touch display module, the control management module, the wireless communication module, the USB module, the microphone, and the loudspeaker.

In this embodiment of the present disclosure, as a preferred solution, the multipath device working system further includes an audio processing module configured to process audio data transmitted by the external communication device and audio data received and played by the microphone and the loudspeaker.

In this embodiment of the present disclosure, as a preferred solution, the multipath device working system further includes an audio mixing module configured to mix a plurality of channels of voice data. The audio mixing module may include only one audio mixer located on the processor. A plurality of channels of audio data sent by all external devices connected to the multipath device working system are all mixed by the audio mixer on the processor. As a preferred solution, the audio mixing module may alternatively include a first audio mixer located on the DECT module and a second audio mixer located on the processor. The first audio mixer is configured to mix a plurality of channels of audio data received by the DECT module and sent by a plurality of wireless headsets, and the second audio mixer is configured to mix a plurality of channels of audio data from a mobile device, an Internet protocol (IP), and an IP phone received by the Bluetooth module and the USB module. When a plurality of devices make a call simultaneously, audio data is processed by different audio mixers, to reduce the load of the processor.

Figure 2:
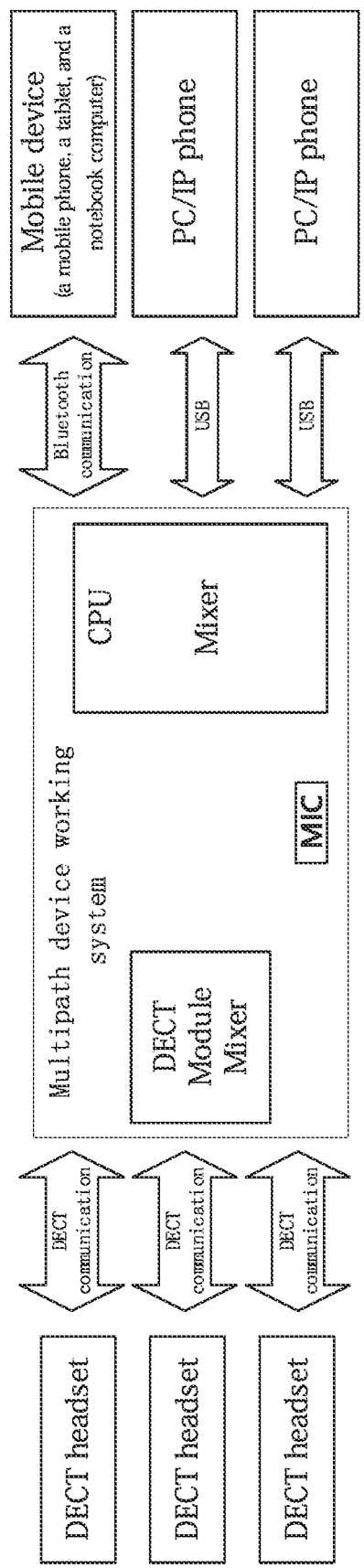
FIG. 2 is another schematic structural diagram of a multipath device working system according to an embodiment of the present disclosure.

Referring to FIG. 1 and FIG. 2, based on the solution, to better understanding the multipath device working system provided in the embodiments of the present disclosure, a detailed description is made below.

An embodiment of the present disclosure provides a highly integrated office peripheral solution in which a Unified Communications (UC) workstation (a multipath device working system) is added, a wireless headset, a microphone, a Unified Communications (UC) soft phone, and a USB extender are integrated, and modules may further be expanded to implement practical functions such as wireless charging and busy status indication of a mobile phone. A user only needs to connect one UC workstation, so that a plurality of office peripherals may be connected and a plurality of devices are controlled. Voice streams of a plurality of communication devices or software may be aggregated on the workstation, to provide great convenience to a user.

In this embodiment of the present disclosure, a multipath device working system is added to a conventional distributed system, and various devices are uniformly controlled and managed by the multipath device working system, so that a plurality of hardware communication devices and software can be used simultaneously.

In this embodiment of the present disclosure, the multipath device working system has the following functions: (1) a touch display module is built in and is configured to perform display and touch operations on a display screen; (2) an audio processing module is built in and is configured to process received audio data; (3) a wireless module may be a built-in DECT module and/or a Bluetooth module, the DECT module is built in and configured to be connected to and communicate with a DECT wireless headset, and the Bluetooth module may be a built-in Bluetooth module or may be connected to a Dongle by a USB interface and is configured to be in Bluetooth connection and communication with a mobile phone; and (4) a USB interface is built in and may be connected to a PC and an IP phone to perform USB connection and USB audio data transmission. (5) A microphone and a loudspeaker are provided, and picking up and playing may be directly performed without a headset or a microphone. (6) A control management module is provided and is configured to manage a plurality of communication software on the external communication device, to implement flexible switching among a plurality of software communication terminals, thereby avoiding a flashback or a call interruption caused by incompatibility.

It should be noted that in one aspect, the multipath device working system may be extended to connect a plurality of DECT wireless headsets and pair with a main headset. When a communication device (a phone, a computer, or a mobile phone) connected to the multipath device working system by a USB or Bluetooth has a call, the communication device may answer the call. Control instructions such as answering, hanging up, holding, and hands-free may be input on a touch display screen of the multipath device working system or may be input on the communication device (the telephone, the computer, or the mobile phone). When holding a conference by headsets, a plurality of people may access to the conference by other headsets connected to the multipath device working system. In addition, a plurality of channels of headset voice streams may be aggregated on the multipath device working system (by an audio mixing module such as a mixer). A plurality of people may participate in a conference through hands-free by a microphone (MIC)/speaker. To avoid audio crosstalk, the MIC and the speaker may be connected to different circuit boards. The multipath device working system, serving as a conference organizer, may perform a call control operation, such as mute or moving out of a participant, on paired wireless headsets. As participants, the paired wireless headsets can only control audio of the paired wireless headsets through the headsets, and cannot control audio of the organizer and the whole conference.

In addition, the multipath device working system may be connected to a plurality of devices simultaneously. The multipath device working system may be connected to a mobile device such as a mobile phone, a tablet, or a notebook computer through Bluetooth pairing, or may be connected to a mobile phone by a built-in Bluetooth and connected to a notebook computer by an external Bluetooth Dongle, or may be connected to a PC and an IP phone by a USB. For example, the multipath device working system is connected to a mobile phone through Bluetooth pairing. When the mobile phone has a call, the call may be answered by the mobile phone or by the multipath device working system. After the call is answered, audio may also be switched between the multipath device working system and the mobile phone. If the current call has not ended and a SIP phone or communication software of a PC has a second call, whether the second call is answered and whether the multiple calls need to be mixed to one call, that is, a multi-party conference is formed may be selected by the multipath device working system, the SIP phone, or the communication software of the PC. In addition, the multipath device working system may manage and control a plurality of software, and a user may randomly switch the software as required. Preferably, audio mixing may also be performed on a plurality of calls of a plurality of software communication terminals, to implement a multi-party conference among different software communication terminals.

In another embodiment, the processor in the multipath device working system is configured to execute the program modules stored in a memory, where the program modules include the control management module, the audio processing module, and the audio mixing module.

Compared with the related art, the present disclosure provides a highly integrated office peripheral solution in which a UC workstation (a multipath device working system) is added. A user only needs to connect one UC workstation, so that a plurality of office peripherals may be connected and a plurality of devices are controlled. Voice streams of a plurality of communication devices or software may be aggregated on the workstation. A touch display module, a control management module, a DECT module, a Bluetooth module, a USB module, a microphone, and the like are built in the UC workstation. A mobile device (including a mobile phone, a tablet, and the like), a PC, and an IP phone may be connected simultaneously by Bluetooth, and a local DECT can be extended to connect a plurality of wireless headsets. Because the touch display module is built in, connected devices may be directly controlled by a touch display screen, and the operation is simple. Because the control management module may manage and control a plurality of software communication terminals, a user may randomly switch the software communication terminals as required, to implement a multi-party conference among different software communication terminals.

The above described are merely preferred implementations of the present disclosure. It should be noted that several improvements and modifications may further be made by a person of ordinary skill in the art without departing from the principle of the present disclosure, and such improvements and modifications should also be considered as falling within the protection scope of the present disclosure.

The invention claimed is:

1. A multipath device working system, comprising a processor and a touch display module, a control management module, a wireless communication module, a universal serial bus (USB) module, a microphone, and a loudspeaker that are respectively connected to the processor, wherein
the touch display module is configured to display a user operation interface and obtain a control instruction from a user;
both the wireless communication module and the USB module are configured to perform data transmission between the multipath device working system and an external communication device;
the control management module is configured to manage a plurality of software communication terminals on the external communication device; and
the processor is configured to separately perform data processing on data transmitted by the touch display module, the control management module, the wireless communication module, the USB module, the microphone, and the loudspeaker;

wherein the multipath device working system further comprises an audio mixing module configured to mix a plurality of channels of voice data transmitted by the external communication device, the wireless communication module, and the USB module; the wireless communication module comprises a digital enhanced cordless telecommunications (DECT) module and a Bluetooth module;

the audio mixing module comprises a first audio mixer located on the DECT module and a second audio mixer located on the processor; the first audio mixer is configured to mix a plurality of channels of audio data received by the DECT module and sent by a plurality of wireless headsets; and the control management module is a program located in the multipath device working system, and the program is downloaded to the external communication device connected to the multipath device working system and runs on an operating system of the external communication device; and the control management module is configured to manage a plurality of communication software on the external communication device to implement a protocol conversion function, which resolves a compatibility problem of the plurality of communication software caused by different protocols.

2. The multipath device working system according to claim 1, wherein the Bluetooth module comprises at least one of a built-in Bluetooth and an external Bluetooth Dongle.

3. The multipath device working system according to claim 1, wherein the USB module comprises a plurality of USB interfaces.

4. The multipath device working system according to claim 1, wherein the control management module is located on the external communication device connected to the multipath device working system.

5. The multipath device working system according to claim 1, wherein the external communication device comprises at least one of the wireless headset, a personal computer, a mobile phone, and a desktop session initiation protocol (SIP) phone.

* * * * *